(12) United States Patent
Jerschow

(10) Patent No.: US 7,902,284 B2
(45) Date of Patent: *Mar. 8, 2011

(54) COMPOSITION BASED ON ORGANOSILICON COMPOUNDS

(75) Inventor: Peter Jerschow, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/374,243

(22) PCT Filed: Jul. 4, 2007

(86) PCT No.: PCT/EP2007/056719
§ 371 (c)(1), (2), (4) Date: Jan. 16, 2009

(87) PCT Pub. No.: WO2008/009555
PCT Pub. Date: Jan. 24, 2008

(65) Prior Publication Data
US 2009/0247684 A1    Oct. 1, 2009

(30) Foreign Application Priority Data
Jul. 18, 2006 (DE) .................. 10 2006 033 236

(51) Int. Cl.
C08K 3/18 (2006.01)
C08K 3/22 (2006.01)
C08K 3/10 (2006.01)
C08K 3/34 (2006.01)
C04B 26/06 (2006.01)
C04B 35/00 (2006.01)
B60C 1/00 (2006.01)
C08G 77/00 (2006.01)
C08G 77/04 (2006.01)
A61K 6/083 (2006.01)
B29B 9/00 (2006.01)

(52) U.S. Cl. ......... 524/430; 524/437; 524/492; 524/493; 501/127; 501/153; 528/10; 528/33; 523/105; 264/5

(58) Field of Classification Search .................. 524/437, 524/430; 501/127, 153
See application file for complete search history.

(56) References Cited

U.S. PATENT DOCUMENTS

| | | | |
|---|---|---|---|
| 3,671,460 A | 6/1972 | Hofgesang | |
| 4,013,611 A | 3/1977 | Hechtl | |
| 4,755,554 A * | 7/1988 | Itoh et al. ............ | 524/588 |
| 5,008,307 A | 4/1991 | Inomata | |
| 5,104,950 A | 4/1992 | Martin | |
| 5,268,441 A | 12/1993 | Barthel et al. | |
| 5,397,817 A * | 3/1995 | Smith .............. | 523/213 |
| 5,419,928 A | 5/1995 | Deusser | |
| 5,501,933 A | 3/1996 | Deusser | |
| 5,591,797 A | 1/1997 | Barthel et al. | |
| 5,610,218 A | 3/1997 | Funk et al. | |
| 5,789,084 A * | 8/1998 | Nakamura et al. .......... | 428/447 |
| 5,936,021 A * | 8/1999 | Bryant et al. ............ | 524/430 |
| 5,977,243 A * | 11/1999 | Barthel et al. ............ | 524/588 |
| 6,193,795 B1 * | 2/2001 | Nargiello et al. ........... | 106/484 |
| 6,294,635 B1 | 9/2001 | Achenbach et al. | |
| 6,441,086 B1 * | 8/2002 | Wolfer et al. ............ | 524/588 |
| 6,620,866 B1 | 9/2003 | Obrecht | |
| 7,250,127 B2 * | 7/2007 | Geck et al. ................ | 264/142 |
| 2002/0197475 A1 | 12/2002 | Edelmann | |
| 2004/0249041 A1 | 12/2004 | Meloni | |
| 2005/0004295 A1 | 1/2005 | Braun | |
| 2006/0088783 A1 * | 4/2006 | Liu et al. ................. | 430/137.14 |
| 2006/0204528 A1 | 9/2006 | Nolte | |
| 2007/0111880 A1 * | 5/2007 | Schumacher et al. ....... | 501/127 |
| 2007/0196658 A1 | 8/2007 | Briehn | |
| 2008/0034794 A1 | 2/2008 | Ebbrecht | |
| 2009/0137446 A1 | 5/2009 | Rautschek | |

FOREIGN PATENT DOCUMENTS

| | | |
|---|---|---|
| DE | 2120974 A | 11/1971 |
| DE | 2433697 A1 | 1/1976 |
| DE | 4202694 C1 | 7/1993 |
| DE | 43 36 345 A1 | 4/1995 |
| DE | 44 01 606 A1 | 7/1995 |
| DE | 44 05 245 A1 | 8/1995 |
| DE | 101 23 935 A1 | 11/2001 |
| DE | 103 30 287 A1 | 2/2004 |
| DE | 102004051897 A1 | 4/2006 |
| DE | 102005006870 A1 | 8/2006 |

(Continued)

OTHER PUBLICATIONS

Kirk-Othmer Encyclopedia of Chemical Technology: Silicones, 2002.*
Wagner, M.P. "High performance precipitated silica equivalent to fumed silica in silicone reinforcement." Rubber World. Jun. 1, 1992.*
Degussa, Basis Characteristics of Aerosil Fumed Silica, Technical Bulletin Fine Particles, No. 11, Apr. 2006.
Produktinformation Aeroxide Alu C.
Loctite 5404 Technical Data Sheet-Oct. 2004.
IHS Datenblatt 5404 Qutput Adhesive Thermally conductive Silicone, 266665 as manufactured by Henkel Loctite.
Brook Michael A, et al., Pt compounds bound in a silsesquioxane layer: active hydrosilation catalysts protected by the gel, Inorganica Chemica Acta, vol. 264, 1997.
Produktinformation Aeroxide Alu C 805.
Cas-Nr. 713508-70-4, STN/CA Referat.
Hartwig et al., Novel nanocomposite polymers and joining technologies for reliable and efficient assembly of electronic components, FAM, Sep. 8, 2005.
Kraus Juliane, Spritzgießen nanoskaliger keramischer Pulver am Beispiel des Degussa Aluminiumoxid C, Dissertation Universität Lindau Juli 19999.

*Primary Examiner* — Vasu Jagannathan
*Assistant Examiner* — Anthony H Sheh
(74) *Attorney, Agent, or Firm* — Brooks Kushman P.C.

(57) ABSTRACT

Organosilicon compositions which can be cured to produce elastomers, in particular elastomers suitable for use in the food industry, contain very fine particulate aluminum oxide powder in minor amount. Non-blocking sheets and pellets can be formed from the compositions, and later molded and cured.

16 Claims, No Drawings

FOREIGN PATENT DOCUMENTS

| | | |
|---|---|---|
| DE | 102006020967 A1 | 11/2007 |
| EP | 1 028 140 A1 | 8/2000 |
| EP | 1 101 798 A2 | 5/2001 |
| EP | 1078953 A2 | 8/2001 |
| EP | 1245627 A2 | 10/2002 |
| WO | 03040223 A2 | 5/2003 |
| WO | 2004108595 A2 | 12/2004 |
| WO | 2005/061385 A2 | 7/2005 |
| WO | 2005092933 A1 | 10/2005 |
| WO | 2005/113442 A1 | 12/2005 |

* cited by examiner

COMPOSITION BASED ON ORGANOSILICON COMPOUNDS

CROSS-REFERENCE TO RELATED APPLICATION

This application is the U.S. national phase of PCT Appln. No. PCT/EP2007/056719 filed Jul. 4, 2007 which claims priority to German application DE 10 2006 033 236.9 filed Jul. 18, 2006.

BACKGROUND OF THE INVENTION

1. Field of the Invention

The invention relates to compositions based on organosilicon compounds and aluminum oxide, to a process for the production of the compositions, and to pellets which comprise the composition or are composed thereof, and also to a process for the production of the pellets.

2. Description of the Related Art

Provision of silicone rubber in the form of pellets is important for automated extrusion or injection molding. A problem is that pelletized silicone rubber has not hitherto been obtainable in a form fully approved for use with foods, and is obtainable only in the hardness range from 60 to 80 Shore A.

EP-A 1028140 describes the production of pellets composed of silicone rubber by means of suitable additives.

SUMMARY OF THE INVENTION

The invention provides compositions comprising organosilicon compounds and aluminum oxide powder with a specific surface area of at least 50 m²/g and with an average primary particle size of from 1 to 50 nm.

DETAILED DESCRIPTION OF THE PREFERRED EMBODIMENTS

The organosilicon compounds used in the invention preferably involve those containing units of the formula

$$R_a R^1_b Y_c SiO_{(4-a-b-c)/2} \quad (I),$$

where
R can be identical or different, and is a hydrogen atom or an optionally substituted, SiC-bonded, aliphatically saturated hydrocarbon moiety,
$R^1$ can be identical or different, and is a SiC-bonded, aliphatically unsaturated hydrocarbon moiety,
Y can be identical or different, and is a hydroxy moiety or hydrolyzable moieties moiety,
a is 0, 1, 2, or 3,
b is 0, 1, 2, or 3, and
c is 0, 1, 2, or 3, preferably 1 or 0, most preferably 0,
with the proviso that the sum a+b+c is smaller than or equal to 4.

The organosilicon compounds used in the invention preferably are organopolysiloxanes, i.e. compounds containing the units of the formula (I), where a+b+c is smaller than or equal to 3.

Examples of hydrocarbon radicals R are alkyl, radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical, and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as cyclopentyl, cyclohexyl, and cycloheptyl radicals, and methylcyclohexyl radicals; aryl radicals such as the phenyl, biphenyl, naphthyl, and anthryl, and phenanthryl radicals; alkaryl radicals such as o-, m-, and p-tolyl radicals, xylyl radicals, and ethylphenyl radicals; aralkyl radicals such as the benzyl radical, and the α- and β-phenylethyl radicals.

Examples of substituted hydrocarbon radicals R are halogenated alkyl radicals such as the 3-chloropropyl, the 3,3,3-trifluoropropyl, and the perfluorohexylethyl radicals, and halogenated aryl radicals such as the p-chlorophenyl and the p-chlorobenzyl radicals.

The radical R preferably is a hydrogen atom or optionally substituted hydrocarbon radical having from 1 to 8 carbon atoms. If the radical R is an optionally substituted hydrocarbon radical it is most preferable that it is a methyl, ethyl, phenyl, or 3,3,3-trifluoropropyl radical, in particular the methyl radical.

Examples of the radicals $R^1$ are the vinyl, allyl, methallyl, 1-propenyl, 1-butenyl, and 1-pentenyl radicals, and the 5-hexenyl, butadienyl, hexadienyl, cyclopentenyl, cyclopentadienyl, cyclohexenyl, ethynyl, propargyl, and 1-propynyl radicals.

It is preferable that the radical $R^1$ involves is an alkenyl radical having from 2 to 8 carbon atoms, most preferably the vinyl radical.

It is preferable that the radical Y is a hydroxy radical, an organyloxy radical such as a methoxy, ethoxy, n-propoxy, isopropoxy, n-butoxy, isobutoxy, sec-butoxy, tert-butoxy, or 2-methoxyethoxy radical; an acyloxy radical such as the acetoxy radical; an amino radical such as the methylamino, dimethylamino, ethylamino, diethylamino, and cyclohexylamino radicals; an amido radical such as the N-methylacetamido and benzamido radicals; an aminoxy radical such as the diethylaminoxy radical; an oximo radical such as the methylethylketoximo and methylisobutylketoximo radicals; or an enoxy radical such as the 2-propenoxy radical.

It is more preferable that the radical Y is a hydroxy radical or —$OR^1$ moieties radical, where $R^1$ is defined as above, or an acetoxy or oximo radical, and in particular the hydroxy radical, or a methoxy, ethoxy, or acetoxy radical, and most preferably the ethoxy or acetoxy radical.

Examples of organosilicon compounds used in the invention are linear siloxanes, such as dimethylpolysiloxanes, phenylmethylpolysiloxanes, trifluoropropylpolysiloxanes, and ethylpropyl-polysiloxanes, dimethyl/methylvinylpolysiloxanes having from 2 to 100 vinyl groups, methylvinylpolysiloxanes, diphenyl/phenylvinylpolysiloxanes having from 2 to 100 vinyl groups, phenylvinylpolysiloxanes, and ethylmethyl/ethylvinylpolysiloxanes.

The viscosity of organosilicon compounds used in the invention is preferably from 10,000 to 10⁹ mPa·s, more preferably from ~100-100,000 to 10⁷ mPa·s, and in particular from 10⁶ to 9·10⁶ mPa·s, measured in each case at 25° C.

The compositions of the invention preferably comprise amounts of from 30 to 90 parts by weight of organosilicon compounds, more preferably from 40 to 80 parts by weight, and most preferably from 60 to 75 parts by weight, based in each case on 100 parts by weight of the composition of the invention.

The aluminum oxide used in the invention preferably comprises fine-particle fumed aluminum oxide, i.e. aluminum oxide produced via flame hydrolysis of anhydrous aluminum chloride or of another anhydrous hydrolyzable aluminum compound. The aluminum oxide can, if desired, also take the form of a mixture with other metal oxides, but this is not preferred.

The production of aluminum oxide via flame hydrolysis is well known. Reference may be made in this connection to WO2005061385A and WO2005113442A, for example.

The aluminum oxide powder used in the invention is preferably produced via flame hydrolysis by vaporizing aluminum chloride, if appropriate in a mixture with other volatile metal compounds, e.g. chlorides of Ti, Si, Zr, Zn, Mg, Y, V, W, Ta, Ce, or B where the vapor is passed with the aid of a carrier gas, e.g. dry air, into a mixing chamber and mixed with $H_2$ and an excess of air, if appropriate with introduction of heat, and the mixture is then ignited on passage into the reaction chamber. The solid aluminum oxide formed, if appropriate in a mixture with other metal oxides, is isolated and then—if desired—treated with steam.

The specific surface area (BET) of the aluminum oxide powder used in the invention is preferably from 50 to 400 $m^2/g$, more preferably from 70 to 300 $m^2/g$, and in particular from 80 to 150 $m^2/g$.

The average primary particle size of the aluminum oxide powder used in the invention is preferably from 10 to 20 nm, more preferably from 12 to 14 nm.

The surface of the aluminum oxide used in the invention can, if desired, have been chemically modified, but this is not preferred.

The aluminum oxide powder used in the invention involves a commercially available product.

The compositions of the invention preferably comprise amounts of from 0.1 to 20 parts by weight of aluminum oxide powder, more preferably from 0.2 to 14 parts by weight, and most preferably from 0.3 to 3 parts by weight, based in each case on 100 parts by weight of the composition of the invention.

The compositions of the invention can comprise not only organosilicon compounds and aluminum oxide but also further substances, such as water, boric acid, and other pulverulent substances differing from aluminum oxide, examples being fillers.

Examples of fillers used if appropriate are reinforcing and/or nonreinforcing fillers.

Examples of reinforcing fillers, i.e. fillers whose BET surface area is at least 50 $m^2/g$, are fumed silica, precipitated silica, and carbon black, such as furnace black and acetylene black.

The silica fillers mentioned can have hydrophilic character or can have been hydrophobized by known processes, preference being given here to silica fillers with hydrophilic character.

The reinforcing filler used if appropriate preferably is hydrophilic fumed silica whose BET surface area is from 50 to 400 $m^2/g$, more preferably from 150 to 300 $m^2/g$.

Examples of nonreinforcing fillers are quartz, diatomaceous earth, calcium silicate, zirconium silicate, zeolites, metal oxide powders, such as titanium oxides, iron oxides, or zinc oxides, or mixed oxides of these, barium sulfate, calcium carbonate, calcium sulfate, silicon nitride, silicon carbide, boron nitride, aluminum hydroxide (ATH), mica, talc, kaolin, metal titanates and metal zirconates, and also polytetrafluoroethylene powders. Other fillers that can be used are fibrous components, such as glass fibers and synthetic fibers. The BET surface area of these fillers is preferably below 50 $m^2/g$.

The compositions of the invention preferably comprise reinforcing filler or a mixture composed of reinforcing and nonreinforcing filler.

The compositions of the invention are preferably filled with a sufficient amount of filler differing from aluminum oxide to achieve the desired consistency, which depends on the intended application.

The compositions of the invention preferably have a plasticine-like consistency, and high viscosity and plasticity (=sheet integrity), or take the form of pellets.

The compositions of the invention can be crosslinkable or non-crosslinkable compositions.

The compositions of the invention have particularly good suitability for the production of cables, of cable insulation, of cable sheathing, of moldings, of profiles, of dimensionally stable unvulcanized profiles, and of textile coatings with good sheet integrity.

The compositions of the invention can involve any desired types hitherto known of compositions that can be crosslinked to give elastomers and that are based on organosilicon compounds, examples being single- or two-component organopolysiloxane compositions that can be vulcanized at room temperature (known as RTV compositions) or at an elevated temperature (known as HTV compositions), and the crosslinking here can take place through condensation, or an addition reaction of Si-bonded hydrogen onto an aliphatic multiple bond, or peroxidically via formation of radicals or via exposure to radiation. The crosslinkable compositions here can be free from fillers differing from aluminum oxide, but can also comprise active or non-active fillers differing from aluminum oxide, and it is preferable that fillers differing from aluminum oxide are present.

The nature and amount of the components usually used in these compositions are known. By way of example, reference may be made in this connection to U.S. Pat. No. 5,268,441, DE-A 44 01 606, DE-A 44 05 245, and DE-A 43 36 345.

The aluminum oxide used in the invention here can be mixed as desired with the other components of the crosslinkable compositions of the invention. It can by way of example be incorporated in a final step by mixing into the otherwise finished silicone rubber formulation, or it can be incorporated during the production of the silicone rubber mixture. However, the aluminum oxide can also be premixed into one or more of the components used.

Each of the components used to produce the compositions of the invention can involve a single type of such a component or else a mixture composed of at least two different types of such a component.

The mixing process for production of the compositions of the invention is preferably simple mechanical mixing. As a function of consistency and viscosity of the main material, the mixing process can take place on roll mills, in kneaders, in dissolvers, in Z mixers, in ball mills, or in simple mixers, preference being given here to roll mills, kneaders, and Z mixers. The mixing process is preferably carried out at ambient pressure, simply for reasons of simplicity. However, mixing at reduced or increased pressure is also possible. Again for reasons of simplicity, the mixing process is preferably carried out at ambient temperature. However, mixing is also possible at increased temperature or with cooling. If desired, pelletization may follow. This can take place in a known manner after combination of the individual components of the composition of the invention, using customary pelletizers, such as a pelletizing die and a rotating knife.

The invention further provides a process for the production of pellets based on organosilicon compounds, characterized in that organosilicon compounds and aluminum oxide with a specific surface area of at least 50 $m^2/g$ and with an average primary particle size of from 1 to 50 nm are mixed with one another in a mixing apparatus and the pellets are then shaped using pelletizers.

It is preferable that the pelletizer involves an extruder, e.g. a single-screw, twin-screw, or ram extruder, or a gear pump, in each case equipped with a pelletizing die and a rotating knife.

The production of the pelletizable composition of the invention can, if desired, also be carried out by means of heated continuous mixing equipment.

The composition can be pelletized directly from the mixing device. The composition can also be pelletized in a second step after intermediate treatment, e.g. coloring, or addition of any desired additives.

The process of the invention for production of pellets is preferably carried out at a temperature of from 20 to 50° C. and at the pressure of the ambient atmosphere, i.e. from about 900 to 1100 hPa, but the pressure in the pelletizer can be up to 500,000 hPa.

The pellets of the invention are preferably given a light coating of talc directly after chopping by the rotating knife, and are preferably cooled as quickly as possible to 20° C.

The average particle size of the pellets of the invention or the pellets produced in the invention is preferably from 1 to 100 mm, more preferably from 2 to 9 mm. The pellets of the invention preferably have a typical cylindrical pellet structure whose diameter is preferably from 1 to 100 mm, more preferably from 2 to 9 mm, their length preferably being from 1 to 100 mm, more preferably from 2 to 9 mm.

The compositions of the invention have the advantage of being easy to produce and easy to process.

The process of the invention has the advantage of permitting production of pellets with good free-flow properties.

The pellets of the invention have the advantage of being stable in storage and therefore providing at least 6 months of fully satisfactory processability.

Another advantage of the pellets of the invention is that they can be conveyed automatically and can be processed on any of the conventional plants for the processing of silicone rubber (press vulcanization, transfer presses, extrusion, injection molding, calendering, etc.).

Further advantages are increased sheet integrity in the unpelletized condition, improved calenderability (=less tack on rolls and calenders), and suitability for use with foods.

The pellets of the invention can then be used for any of the purposes for which pellets based on organosilicon compounds have been used hitherto. In this connection, mention may be made by way of example of the production of profiles, of cables, of hoses, of sheets, of films, of foam, and of moldings.

If the compositions of the invention involve pellets or involve mixtures of good sheet integrity, these can have been rendered crosslinkable or non-crosslinkable. In the non-crosslinkable state, these pellets can be used as additives as described in DE-A 10330287. In the crosslinkable state, the pellets comprise one of the crosslinking systems usual for silicone rubbers.

The compositions of the invention can be crosslinked under conditions identical with those for crosslinkable compositions known hitherto and based on organosilicon compounds. Any of the familiar processes for the processing of silicone rubbers can be used as production process here. Examples of these are calendering, compression molding, injection molding, and extrusion.

The present invention further provides moldings produced via crosslinking of the compositions of the invention.

The moldings of the invention can involve moldings the same as those hitherto produced from crosslinkable compositions based on organosilicon compounds. Examples of the moldings of the invention are pellets, hoses, films, gaskets, injection-molded parts, profiles, cables, sheets, and pipe linings, and also coatings.

The compositions of the invention based on organosilicon compounds can involve compositions that can be stored if water is excluded and that on ingress of water at room temperature can be crosslinked via condensation to give elastomers (crosslinking type I).

The compositions of the invention that can be crosslinked via condensation preferably involve those which comprise
(a) an organosilicon compound having condensable groups,
(b) an organosilicon compound having at least three Si-bonded hydrolyzable moieties,
(c) a condensation catalyst,
(d) aluminum oxide whose specific surface area is at least 50 m$^2$/g and whose average primary particle size is from 1 to 50 nm,
and, if appropriate,
(e) further substances.

For the purposes of the present invention, the term "condensable" moieties also covers moieties which may also include an optional preceding hydrolysis step.

The compositions of the invention that can be crosslinked via condensation can involve single-component compositions or else two-component compositions, where one component in the latter does not simultaneously comprise the constituents (a), (b), and (c).

Organosilicon compound (a) used having condensable groups can comprise organopolysiloxanes containing units of the formula (I), with the proviso that the sum a+b+c is smaller than or equal to 3, and at least one moiety Y is present per molecule, preferably at least two.

Examples of organopolysiloxanes (a) used in the invention are α,ω-dihydroxypolydimethylsiloxanes.

Component (a) used preferably comprises those of the general formula

$$HO(SiR^2_2O)_m SiR^2_2OH \quad (II)$$

where R$^2$ is identical or different, optionally substituted, monovalent hydrocarbon moieties, and m is a whole number whose value is at least 20, preferably a number from 50 to 100,000.

Although formula (II) does not show this, other siloxane units can also be present in addition to the diorganosiloxane units (SiR$^2_2$O), examples being those of the formulae R$^2$SiO$_{3/2}$, R$^2_3$SiO$_{1/2}$, and SiO$_{4/2}$, where R$^2$ is in each case defined as stated above. However, the amount for these siloxane units other than diorganosiloxane units is preferably at most 10 mol percent, in particular at most 1 mol percent, based in each case on the weight of the organopolysiloxanes (a).

Examples of moieties R$^2$ are the examples stated above for moiety R and R$^1$.

The radical R$^2$ preferably is a radical having from 1 to 18 carbon atoms, and more preferably a propyl, hexyl, or octyl radical, and in particular, the methyl radical.

The organosilicon compounds used having at least three Si-bonded hydrolyzable groups (b) preferably comprise silanes of the general formula

$$R^3_{4-n}SiZ_n \quad (III)$$

and/or partial hydrolyzates of these having from 2 to 10 silicon atoms per molecule,
where
R$^3$ can be identical or different and is defined as for R$^2$,
n is 3 or 4, and Z is identical or different hydrolyzable groups, such as an amino, amido, aminoxy, or oximo group, e.g. —ON=C(CH$_3$)(C$_2$H$_5$), alkoxy groups, e.g. methoxy and ethoxy, and alkoxyalkoxy groups, e.g. CH$_3$—O—C$_2$H$_5$—O—, or alkenyloxy groups, such as H$_2$C=(CH$_3$)CO—, and acetoxy groups.

The hydrolyzable group Z preferably involves alkoxy or acetoxy groups.

Moiety R$^3$ preferably involves propyl, hexyl, octyl, vinyl, or methyl moieties, particular preference being given here to vinyl and methyl moieties.

The amount used of the organosilicon compound (b) is preferably from 2 to 10 parts by weight per 100 parts by weight of organosilicon compound (a).

The condensation catalyst (c) preferably involves (organo) metallic compounds, such as the salts of carboxylic acids, and the alcoholates and the halides of the metals Pb, Zn, Zr, Ti, Sb, Fe, Cd, Sn, Ba, Ca, and Mn, e.g. stannous octoate, dibutyltin dilaurate, octyltin triacetate, dioctyltin dioctoate, dioctyltin diacetate, didecyltin diacetate, dibutyltin diacetate, dibutyltin dibromide, dioctyltin dilaurate, trioctyltin acetate, titanium alcoholate, and organotitanium compounds having at least one Si—O—Ti bond.

The amount of condensation catalyst (c) preferably used is from 0.1 to 2 parts by weight per 100 parts by weight of organosilicon compound (a).

As a function of the respective application, further substances (e) can be added to the compositions of the invention that can be vulcanized to give elastomers, with the proviso that the additives (e) differ from component (a), (b), (c), and (d).

Examples of these further substances (e) are fillers, e.g. the substances described above for improving surface properties, examples being adhesion promoters, processing aids, such as plasticizers, pigments, soluble dyes, odorants, fungicides, purely organic resins, corrosion inhibitors, oxidation inhibitors, heat stabilizers, solvents, agents for influencing electrical properties, e.g. conductive carbon black, flame retardants, light stabilizers, and agents for prolonging skinning time, but component (e) here preferably involves fillers, plasticizers, and adhesion promoters.

Examples of plasticizers which can be used as component (e) are polydimethylsiloxanes whose viscosity is at most 1000 mm$^2$/s at 25° C. and which have termination by trimethylsilyl groups or by hydroxy groups, another example being diphenylsilanediol.

Examples of adhesion promoters are aminosilanes, such as aminoethylaminopropyltriethoxysilane, or polysiloxanes which contain aminoethylaminopropylsiloxy groups.

Examples of heat stabilizers are transition metal fatty acid salts, such as iron octoate or cerium octoate, titanium butoxide, transition metal silanolates, such as iron silanolate, and also cerium(IV) compounds, or oxides, e.g. iron oxide or titanium oxide, and mixtures of these, and also various carbon blacks.

The compositions of the invention that can be crosslinked via condensation preferably do not comprise any further substances beyond components (a) to (e).

The compositions of the invention that are based on organosilicon compounds and that can be crosslinked via condensation can be produced by known processes, for example via simple mixing of the individual components. The mixing preferably takes place at room temperature and it is preferable that ingress of water is avoided during this mixing process. However, this mixing process can also, if desired, take place at higher temperatures, e.g. at a temperature in the range from 25 to 80° C.

The usual water content of air is sufficient for the crosslinking of the compositions of the invention. The crosslinking can, if desired, also be carried out at temperatures higher than room temperature, e.g. at from 25 to 120° C., or at temperatures lower than room temperature, e.g. at from −10 to 25° C. The crosslinking can also be carried out at concentrations of water which exceed the normal water content of air.

The compositions of the invention have the advantage of being easy to produce.

The compositions of the invention based on organosilicon compounds can involve those that can be crosslinked via an addition reaction of Si-bonded hydrogen onto an aliphatic carbon-carbon multiple bond (crosslinking type II).

The addition-crosslinkable compositions of the invention based on organosilicon compounds preferably comprise
(1) organosilicon compounds which have SiC-bonded moieties having aliphatic carbon-carbon multiple bonds,
(2) organosilicon compounds having Si-bonded hydrogen atoms, or, instead of (1) and (2),
(3) organosilicon compounds which have SiC-bonded moieties having aliphatic carbon-carbon multiple bonds and which have Si-bonded hydrogen atoms,
(4) catalyst promoting the addition reaction of Si-bonded hydrogen onto an aliphatic multiple bond,
(5) aluminum oxide powder whose specific surface area is at least 50 m$^2$/g and whose average primary particle size is from 1 to 50 nm,
and, if appropriate,
(6) further substances.

If the compositions of the invention involve an addition-crosslinking 2-component silicone rubber composition, the two components of the silicone rubber compositions of the invention can comprise all of the constituents in any desired combination and quantitative proportion, with the proviso that one component cannot simultaneously comprise the constituents (1), (2), and (4) or, respectively, (3) and (4).

The organosilicon compounds (1) preferably involve linear, cyclic, or branched siloxanes containing units of the formula (I), with the proviso that the sum a+b+c is smaller than or equal to 3, c is preferably 0, and at least two moieties R$^1$ are present per molecule.

The organosilicon compounds (1) most preferably are linear organopolysiloxanes of the structure

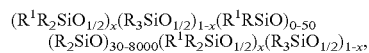

where R and R$^1$ can be identical or different, and are subject to one of the abovementioned definitions, and x can be identical or different and is 0 or 1, with the proviso that at least two moieties R$^1$ are present.

Examples of organopolysiloxanes (1) used in the invention are trimethylsilyl-terminated polymethylvinylsiloxanes and vinyldimethylsilyl-terminated polymethylvinyl/dimethylsiloxanes.

The organosilicon compounds (2) used which have Si-bonded hydrogen atoms preferably comprise linear, cyclic, or branched siloxanes containing units of the formula (I), with the proviso that the sum a+b+c is smaller than or equal to 3, c is preferably 0, and an average of at least two moieties R per molecule are an Si-bonded hydrogen atom.

The viscosity of the organosilicon compounds (2) is preferably from 50 to 10000 mPas at 25° C.

Particular examples of polyorganosiloxanes (2) are copolymers composed of dimethylhydrosiloxane units, methylhydrosiloxane units, dimethylsiloxane units, and trimethylsiloxane units, copolymers composed of trimethylsiloxane units, dimethylhydrosiloxane units, and methylhydrosiloxane units, copolymers composed of trimethylsiloxane units, dimethylsiloxane units, and methylhydrosiloxane units, copolymers composed of methylhydrosiloxane units and trimethylsiloxane units, copolymers composed of methylhydrosiloxane units, diphenylsiloxane units, and trimethylsiloxane units, copolymers composed of methylhydrosiloxane units, dimethylhydrosiloxane units, and diphenylsiloxane units, copolymers composed of methylhydrosiloxane units, phenylmethylsiloxane units, trimethylsiloxane units, and/or dimethylhydrosiloxane units, copolymers composed of methylhydrosiloxane units, dimethylsiloxane units, diphenylsiloxane units, trimethylsiloxane units, and/or dimethylhydrosiloxane units, and also copolymers composed of dimethylhydrosiloxane units, trimethylsiloxane units, phenylhydrosiloxane units, dimethylsiloxane units, and/or phenylmethylsiloxane units.

It is preferable to use an organosilicon compound (2) containing three or more SiH bonds per molecule. If a constituent (2) is used which has only two SiH bonds per molecule, the organosilicon compound (1) preferably comprises at least three aliphatic carbon-carbon multiple bonds per molecule. It is therefore preferable that the organosilicon compound (2) is used as crosslinking agent.

The content of Si-bonded hydrogen in the organosilicon compound (2) is preferably from 0.002 to 1.7% by weight of hydrogen, more preferably from 0.1 to 1.7% by weight of hydrogen.

The amount of the polyorganosiloxane (2) present in the curable silicone rubber composition is preferably such that the molar ratio of SiH groups to moieties having an aliphatic carbon-carbon multiple bond of component (1) is from 0.5 to 6, more preferably from 1.5 to 2.5.

If organosilicon compounds (3) are used, they preferably are what are known as MQ resins whose viscosity is preferably from 0.01 to 500,000 Pa·s, more preferably from 0.1 to 150,000 Pa·s, in each case at 25° C.

Any of the hydrosilylation catalysts known hitherto can be used in the compositions of the invention, as constituent (4), which promotes the addition reaction (hydrosilylation reaction) between Si-bonded hydrogen and the moieties having an aliphatic carbon-carbon multiple bond.

Examples of hydrosilylation catalysts (4) are metals, such as platinum, rhodium, palladium, ruthenium, and iridium, preferably platinum, and these may, if appropriate, have been fixed on fine-particle carrier materials, such as activated charcoal, aluminum oxide, or silicon dioxide, other examples being compounds and complexes of the metals mentioned. The hydrosilylation catalyst (4) can also be used in microencapsulated form, where an example of the fine-particle solid which is insoluble in the polyorganosiloxane and which comprises the catalyst is a thermoplastic (polyester resins, silicone resins). The hydrosilylation catalyst can also be used in the form of an inclusion compound, for example in a cyclodextrin.

It is preferable that platinum, or else its compounds and complexes, is/are used as catalyst (4).

The amount of the catalyst (4) depends on the desired crosslinking rate and on the respective use, and also on economic factors. The amounts of the catalysts (4) present in the compositions of the invention are such that the resultant platinum content is preferably from 0.1 to 500 ppm by weight (=parts by weight per million parts by weight), more preferably from 1 to 100 ppm by weight, and in particular from 1 to 50 ppm by weight, based in each case on the total weight of the crosslinkable composition.

The amount of aluminum oxide (5) preferably used in the invention is from 0.1 to 20 parts by weight, more preferably from 0.2 to 14 parts by weight, and in particular from 0.3 to 3 parts by weight per 100 parts by weight of composition that can be crosslinked via an addition reaction.

The curable compositions of the invention can comprise not only components (1) to (5) but also any of the further substances (6) used hitherto for the production of addition-crosslinkable compositions, with the proviso that the further substances (6) differ from components (1) to (5).

Examples of further substances (6) are reinforcing fillers, nonreinforcing fillers, resinous polyorganosiloxanes differing from the siloxanes (1), (2), and (3), dispersing agents, solvents, adhesion promoters, pigments, dyes, plasticizers, organic polymers, heat stabilizers, inhibitors, and stabilizers.

Examples of familiar inhibitors which can be used as component (6) are acetylenic alcohols, such as 1-ethynyl-1-cyclohexanol, 2-methyl-3-butyn-2-ol, and 3,5-dimethyl-1-hexyn-3-ol, 3-methyl-1-dodecyn-3-ol, polymethylvinylcyclosiloxanes, such as 1,3,5,7-tetravinyltetramethyltetracyclosiloxane, tetravinyldimethyldisiloxane, trialkyl cyanurates, alkyl maleates, such as diallyl maleates, dimethyl maleate, and diethyl maleate, alkyl fumarates, such as diallyl fumarate and diethyl fumarate, organic hydroperoxides, such as cumene hydroperoxide, tert-butyl hydroperoxide, and pinane hydroperoxide, organic peroxides, organic sulfoxides, organic amines, diamines, and amides, phosphanes, and phosphites, nitrites, triazoles, diaziridines, and oximes.

The inhibitor content of the compositions of the invention is preferably from 0 to 50,000 ppm, more preferably from 50 to 2000 ppm.

Examples of fillers, plasticizers, and heat stabilizers are the examples given above in the context of the condensation-crosslinkable compositions.

The compositions of the invention can—in particular as a function of the viscosity of the constituents, and also filler content—have a pasty consistency, or be pulverulent, or else can be the type of conformable, high-viscosity compositions known among the compositions frequently called HTV by persons skilled in the art. In particular, if the compositions of the invention have high viscosity, they can be provided in the form of pellets.

Known processes can be used to produce the organopolysiloxane compositions of the invention, an example being uniform mixing of the individual components. The form taken by the individual components can by this stage be entirely or to some extent that of pellets.

The compositions of the invention that can be crosslinked via an addition reaction preferably comprise no further substances beyond components (1) to (6).

The compositions of the invention that can be crosslinked via an addition reaction of Si-bonded hydrogen onto an aliphatic multiple bond can be crosslinked under conditions identical with those for the compositions known hitherto that can be crosslinked via a hydrosilylation reaction. This preferably involves temperatures of from 100 to 600° C. and a pressure of from 900 to 1100 hPa. However, it is also possible to apply higher or lower temperatures and pressures, as a function of the processing method.

The compositions of the invention, and also the crosslinking products produced therefrom in the invention, can be used for any other purposes for which elastomers and, respectively, organopolysiloxane compositions that can be crosslinked to give elastomers have been used hitherto.

The compositions of the invention have the advantage that they are easy to produce and are stable over a long period.

Another advantage of the compositions of the invention is that pellets of various compositions and Shore hardnesses can be mixed with one another.

The compositions of the invention based on organosilicon compounds can involve peroxidically crosslinkable compositions (crosslinking type III).

The compositions of the invention that can be crosslinked peroxidically, based on organosilicon compounds, preferably comprise (A) organosilicon compounds containing units of the general formula (I), with the proviso that the sum a+b+c is smaller than or equal to 3, (B) an agent bringing about crosslinking by way of free radicals, (C) aluminum oxide powder whose specific surface area is at least 50 $m^2/g$ and whose average primary particle size is from 1 to 50 nm, and, if appropriate, (D) further substances.

It is preferable that the organosilicon compounds (A) involve organopolysiloxanes containing units of the formula (I) in which at least 70% of all of the Si-bonded moieties are defined as SiC-bonded alkyl moieties, in particular methyl moieties, where the units of the formula (I) preferably involve diorganosiloxane units.

The end groups of the organosilicon compounds (A) can be trialkylsiloxy groups, in particular the trimethylsiloxy moiety or the dimethylvinylsiloxy moiety; however, it is also possible that one or more of these alkyl groups has/have been replaced by hydroxy groups or by alkoxy groups, such as methoxy moieties or ethoxy moieties.

Examples of organopolysiloxanes (A) used in the invention are the examples given above for organosilicon compounds (1).

The organosilicon compounds (A) can involve liquids or high-viscosity substances. The viscosity of the organosilicon compounds (A) at 25° C. is preferably from $10^3$ to $10^8$ $mm^2/s$.

Component (B) can generally involve an agent that brings about or initiates, by way of free radicals, the crosslinking process, and which has been used hitherto in peroxidically crosslinkable compositions, preference being given here to peroxides, in particular organic peroxides.

Examples of component (B) are peroxides such as dibenzoyl peroxide, bis(2,4-dichlorobenzoyl)peroxide, dicumyl peroxide, and 2,5-bis(tert-butylperoxy)-2,5-dimethylhexane, and also mixtures of these, preference being given here to bis(2,4-dichlorobenzoyl)peroxide, and 2,5-bis(tert-butylperoxy)-2,5-dimethylhexane.

The amounts of component (B) present in the organopolysiloxane compositions of the invention that can be crosslinked to give elastomers are preferably from 0.4 to 2.0 percent by weight, more preferably from 0.7 to 1.5 percent by weight, based in each case on the total weight of the peroxidically crosslinkable composition.

The amount of aluminum oxide (C) used in the invention is preferably from 0.1 to 20 parts by weight, more preferably from 0.2 to 14 parts by weight, and in particular from 0.3 to 3 parts by weight per 100 parts by weight of peroxidically crosslinkable composition.

As a function of the respective application, further substances (D) can be added to the compositions of the invention that can be vulcanized to give elastomers, with the proviso that the additives (D) differ from component (A) to (C).

Examples of these further substances (D) are fillers, plasticizers, pigments, and stabilizers, such as heat stabilizers.

Examples of fillers, plasticizers, and heat stabilizers are the examples given above in connection with the condensation-crosslinkable compositions.

If the peroxidically crosslinkable compositions of the invention comprise filler as component (D), the amounts involved are preferably from 1 to 200 parts by weight, particularly preferably from 30 to 100 parts by weight, based in each case on 100 parts by weight of organosilicon compound (A).

The peroxidically crosslinkable compositions of the invention preferably comprise no further substances beyond these.

Known processes can be used to produce the peroxidically crosslinkable organopolysiloxane compositions of the invention, an example being simple mixing of the individual components.

The peroxidically crosslinkable compositions of the invention can be crosslinked under conditions identical with those for the peroxidically crosslinkable compositions known hitherto.

The compositions of the invention, and also the elastomers produced therefrom in the invention, can be used for any of the purposes for which elastomers, or organopolysiloxane compositions that can be crosslinked to give elastomers, have been used hitherto. The compositions of the invention have particularly good suitability for the production of cables, of cable insulation, of cable sheathing, of moldings, of profiles, of dimensionally stable unvulcanized profiles, and of textile coatings with good sheet integrity.

The compositions of the invention have the advantage that in the form of pellets they can be conveyed automatically and in the form of extrudate or of milled sheet they have good firmness and sheet integrity.

The compositions of the invention based on organosilicon compounds can involve compositions that can be crosslinked via radiation (crosslinking type IV).

The radiation-crosslinkable compositions preferably involve those comprising (i) organosilicon compounds containing units of the formula (I), with the proviso that the sum a+b+c is smaller than or equal to 3, and vinyl groups are present, (ii) aluminum oxide whose specific surface area is at least 50 $m^2/g$, and whose average primary particle size is from 1 to 50 nm, and, if appropriate, (iii) at least one crosslinking agent, and, if appropriate, (iv) one photopolymerization initiator, and, if appropriate, (v) filler, and, if appropriate, (vi) adhesion promoter, and, if appropriate, (vii) further substances selected from the group consisting of plasticizers, stabilizers, antioxidants, flame retardants, light stabilizers, and pigments, and, if appropriate, (viii) polymerization inhibitors.

These crosslinkable compositions of the invention preferably involve single-component compositions. To provide these single-component compositions, the respective constituents used can be mixed with one another in any desired manner known hitherto.

The compositions of the invention are preferably produced and stored under conditions substantially free from radiation and, if appropriate, substantially free from water, in order to avoid premature reaction of the compositions.

Examples of organopolysiloxanes (i) used in the invention are the examples given above for organosilicon compounds (1).

The amount preferably used of aluminum oxide (ii) in the invention is from 0.1 to 20 parts by weight, particularly from 0.2 to 14 parts by weight, in particular from 0.3 to 3 parts by weight per 100 parts by weight of composition that can be crosslinked via radiation.

The crosslinking agent (iii) used if appropriate can comprise any of the crosslinking agents used hitherto in compositions that can be crosslinked via radiation; these preferably comprise a radiation-curable, aliphatic carbon-carbon multiple bond.

It is preferable that crosslinking agents (iii) are vinyl- and allylsilanes, olefins, acrylates, and methacrylates, more preferably acrylates and methacrylates, and in particular mono- and difunctional acrylates and methacrylates.

Examples of crosslinking agents (iii) used if appropriate are monofunctional oligo(ethers) and monomeric acrylates and methacrylates, such as 2-(2-ethoxyethoxy)ethyl acrylate, 2-phenoxyethyl acrylate, caprolactone acrylate, cyclic trimethylolpropane formal acrylate, ethoxylated nonylphenol acrylate, isobornyl acrylate, isodecyl acrylate, lauryl acrylate, octyldecyl acrylate, stearyl acrylate, tetrahydro-furfuryl acrylate, tridecyl acrylate, 2-phenoxyethyl methacrylate, ethoxylated hydroxyethyl methacrylate, isobornyl methacrylate, lauryl methacrylate, methoxypolyethylene glycol(350) monomethacrylate, methoxypolyethylene glycol(550) monomethacrylate, polypropylene glycol monomethacrylate, stearyl methacrylate, tetrahydrofurfuryl methacrylate; difunctional oligo(ethers) and monomeric acrylates and methacrylates, such as 1,6-hexanediol diacrylate, alkoxylated diacrylates, alkoxylated hexanediol diacrylates, diethylene glycol diacrylate, dipropylene glycol diacrylate, ester diol diacrylate, ethoxylated bisphenol A diacrylates, polyethylene glycol(200) diacrylate, polyethylene glycol(400) diacrylate, polyethylene glycol(600) diacrylate, propoxylated neopentyl glycol diacrylate, tetraethylene glycol diacrylate, tricyclodecanedimethanol diacrylate, triethylene glycol diacrylate, tripropylene glycol diacrylate, 1,3-butylene glycol dimethacrylate, 1,4-butanediol dimethacrylate, 1,6-hexandiol dimethacrylate, diethylene glycol dimethacrylate, ethoxylated bisphenol A dimethacrylates, ethylene glycol dimethacrylate, polyethylene glycol(200) dimethacrylate, polyethylene glycol(400) dimethacrylate, polyethylene glycol(600) dimethacrylate, tetraethylene glycol dimethacrylate, triethylene glycol dimethacrylate;
trifunctional and higher polyfunctional oligo(ethers) and monomeric acrylates and methacrylates, such as dipentaerythritol pentaacrylate, ditrimethylolpropane tetraacrylate, ethoxylated trimethylolpropane triacrylates, pentaerythritol tetraacrylate, penta-erythritol triacrylate, propoxylated glycerol triacrylates, propoxylated trimethylolpropane triacrylate, trimethylolpropane triacrylate, tris(2-hydroxyethyl) isocyanurate triacrylate, trimethylol-propane trimethacrylate;
epoxy acrylates, such as bisphenol A epoxy acrylate, epoxidized soybean oil acrylate, epoxy novolac acrylate oligomer, fatty acid-modified bisphenol A epoxy acrylate;
aliphatic and aromatic urethane acrylates and polyester acrylates;
silanes containing SiC-bonded vinyl, allyl, acryloxy, methacryloxy groups and also their partial hydrolyzates and cohydrolyzates;
styrene, isoprene, butadiene and vinyl acetate.

If the crosslinkable compositions of the invention comprise crosslinking agents (iii), the amounts involved are from preferably 0.05 to 70 parts by weight, particularly preferably 0.2 to 30 parts by weight, based in each case on 100 parts by weight of crosslinkable composition.

The photopolymerization initiators (iv) used if appropriate can comprise any of the initiators known to the skilled worker, or a mixture thereof.

Examples of initiators (iv) used if appropriate are benzyl dimethyl ketal, 2-hydroxy-2-methylphenylpropan-1-one, 1-hydroxycyclohexyl phenyl ketone, isopropylthioxanthone, bisacylphosphine oxide, 1-[4-(2-hydroxyethoxy)phenyl]-2-hydroxy-2-methylpropan-1-one, benzoin n-butyl ether, polymeric hydroxyketones, such as oligo(2-hydroxy-2-methyl-1, 4-(1-methylvinyl)phenylpropanone), acenaphthylquinone, α-aminoacetophenone, benzanthraquinone, benzoin methyl ether, benzoin isopropyl ether, benzoin isobutyl ether, benzophenone, benzyl dimethyl acetal, benzyl 1-methyl-1-ethyl acetal, 2,2-diethoxy-2-phenylacetophenone, 2,2-diethoxyacetophenone, 2-dimethoxy-benzoyldiphenylphosphine oxide, 2,2-dimethoxy-2-phenyl-acetophenone, 2-ethylanthraquinone, ethyl 2,4,6-trimethylbenzoylphenylphosphinate, hydroxyacetophenone, 2-hydroxy-2-methylpropiophenone, 2-hydroxy-2-methyl-4'-isopropylisopropiophenone, 1-hydroxycyclohexyl phenyl ketone, 4'-morpholinodeoxybenzoin, 4-morpholinobenzophenone, α-phenylbutyrophenone, 2,4,6-trimethylbenzoyldiphenylphosphine oxide, and 4,4'-bis(dimethylamino) benzophenone.

A photopolymerization initiator can also be used in conjunction with coinitiators, examples being ethyl-anthraquinone with 4,4'-bis(dimethylamino)benzophenone, benzoin methyl ether with triphenylphosphine, benzyl dimethyl ketal with benzophenone, diacylphosphine oxides with tertiary amines, or acyldiarylphosphine oxides with benzyl dimethyl acetal.

If the crosslinkable compositions of the invention comprise photopolymerization initiator (iv), the amounts involved are from preferably 0.01 to 5 parts by weight, more preferably 0.05 to 3 parts by weight, based in each case on 100 parts by weight of crosslinkable composition.

Examples of fillers are the examples given above in connection with the condensation-crosslinkable compositions.

If the compositions of the invention comprise fillers (v), preferred amounts involved are from 1 to 200 parts by weight, and with preference from 30 to 100 parts by weight, based in each case on 100 parts by weight of organosilicon compound (i).

The adhesion promoter (vi) used if appropriate can comprise any of the adhesion promoters used hitherto in compositions crosslinkable via radiation. Examples of adhesion promoters (v) are silanes having SiC-bonded vinyl, acryloxy, or methacryloxy groups, and also their partial and co-hydrolyzates, and acrylates, such as 2-(2-ethoxyethoxy)ethyl acrylate, 2-phenoxyethyl acrylate, cyclic trimethylolpropane formal acrylate, 1,6-hexanediol diacrylate, pentaerythritol tetraacrylate, tetrahydrofurfuryl methacrylate, methoxypolyethylene glycol(550) monomethacrylate, and stearyl methacrylate.

If the compositions of the invention comprise adhesion promoters (vi), preferred amounts involved are from 0.01 to 5 parts by weight, with preference from 0.5 to 4 parts by weight, based in each case on 100 parts by weight of crosslinkable composition.

Examples of further substances (vii) are plasticizers, such as trimethylsilyl-terminated polydimethylsiloxanes and hydrocarbons having about 16 to 30 carbon atoms, stabilizers, such as 2-ethylhexyl phosphate, octylphosphonic acid, polyethers, antioxidants, flame retardants, such as phosphoric esters, light stabilizers, and pigments, such as titanium dioxide and iron oxides.

The further substances (vii) used if appropriate preferably involve plasticizers, such as trimethylsilyl-terminated polydimethylsiloxanes and hydrocarbons having about 16 to 30 carbon atoms, stabilizers, such as 2-ethylhexyl phosphate, octylphosphonic acid, polyethers, flame retardants, such as phosphoric esters, and pigments, such as titanium dioxide and iron oxides, particular preference being given here to stabilizers and pigments.

If constituent (vii) is used, the amounts involved are preferably from 0.01 to 30 parts by weight, particularly preferably from 0.05 to 25 parts by weight, based in each case on 100 parts by weight of crosslinkable composition.

The compositions of the invention can comprise polymerization inhibitors (viii). To improve handling, it is preferable to admix small amounts of inhibitors (viii) with the compositions of the invention, for example in order to inhibit premature crosslinking of a ready-to-use formulation during its storage. Examples of inhibitors used if appropriate are any of the familiar inhibitors used hitherto in processes proceeding by way of free radicals, examples being hydroquinone, 4-methoxyphenol, 2,6-di-tert-butyl-4-methylphenol, or phenothiazine.

If inhibitors (viii) are used, the amounts are preferably from 10 to 10,000 ppm, more preferably from 50 to 1 000 ppm, based in each case on parts by weight of the crosslinkable composition.

The compositions of the invention in particular comprise no further constituents other than component (i), (ii), if appropriate (iii), (iv), (v), (vi), (vii), and (viii).

The crosslinkable compositions of the invention are produced by methods known to the person skilled in the art, for example by means of extruders, kneaders, roll mills, or dynamic or static mixers. The compositions of the invention can be produced continuously or batchwise. It is preferable to produce them continuously or by a combined continuous/batchwise method.

The compositions of the invention can be crosslinked via irradiation with ultraviolet light (UV light), laser, or sunlight. The compositions of the invention are preferably crosslinked via UV light. Preferred UV light is that having wavelengths in the range from 200 to 400 nm. The UV light can by way of example be produced in xenon lamps, in low-pressure mercury lamps, in medium-pressure mercury lamps, or in high-pressure mercury lamps, or in excimer lamps. Other suitable light for photocrosslinking is that whose wavelength is from 400 to 600 nm, i.e. that known as "halogen light".

However, suitable energy sources for the crosslinking of the compositions of the invention can also involve X-rays, gamma rays, or electron beams, or can involve simultaneous use of at least two different types of such radiation. In addition to the high-energy radiation, it is possible to introduce heat, and this includes introduction of heat by means of infrared light. However, this introduction of heat is certainly not a requirement and is preferably omitted, in order to reduce energy cost.

The irradiation wavelengths and irradiation times should be matched to the photopolymerization initiators used and to the compounds to be polymerized.

The compositions of the invention are preferably crosslinked at room temperature. The crosslinking can, if desired, also be carried out at temperatures higher or lower than room temperature, for example at from −50 to 15° C. or at from 30 to 150° C. The crosslinking is preferably carried out at a pressure of from 100 to 1100 hPa, in particular at the pressure of the ambient atmosphere, i.e. about 900 to 1100 hPa.

The compositions of the invention can be used wherever compositions that can be crosslinked via radiation have been used hitherto.

The advantages of the compositions of the invention are the same as those mentioned above in connection with the crosslinkable compositions of type (I) to (III).

In the examples below, all data given in parts and percentages is based on weight unless otherwise stated. Unless otherwise stated, the examples below are carried out at the pressure of the ambient atmosphere, i.e. at about 1000 hPa, and at room temperature, i.e. about 20° C., or at the temperature established on combination of the reactants at room temperature, without additional heating or cooling. All of the viscosity data given in the examples are intended to relate to a temperature of 25° C.

An extruder serves as manufacturing equipment for all of the examples, with a rotating knife placed on the die if the intention is to produce pellets. For improved sheet integrity, the mixture is used without pelletization.

Inventive Example 1

The following materials are admixed, in a kneader operated at 150° C., with 100 parts of a diorganopolysiloxane end-capped by trimethylsiloxy groups and composed of 99.93 mol % of dimethylsiloxane units and of 0.07 mol % of vinylmethylsiloxane units, with viscosity 8·10$^6$ mPa·s: firstly 50 parts of fumed silicon dioxide which is generated pyrogenically in the gas phase and whose specific surface area is 200 m$^2$/g, and then 1 part of dimethylpolysiloxane whose viscosity is 96 mPa·s end-capped by trimethylsiloxy groups, and then 7 parts of a dimethylpolysiloxane whose viscosity is 40 mPa·s having an Si-bonded hydroxy group in each of the terminal units, and then again 1 part of dimethylpolysiloxane whose viscosity is 96 mPa·s end-capped by trimethylsiloxy groups, and 1% by weight of an aluminum oxide powder whose specific surface area is at least about 100 m$^2$/g and whose average primary particle size is 13 nm (commercially available as AEROXIDE® Alu C from Degussa AG, Germany).

This mixture can then be pelletized or used in the form of a mixture with good sheet integrity.

The mixture has high sheet integrity. This is characterized in that two strips of thickness 1 cm and width 5 cm can be left in contact with one another for a number of days (=sheet integrity system) without blocking. If the aluminum oxide is omitted, blocking occurs. When the strips are subjected to tension, substantially higher ultimate tensile strength is found in the mixture comprising aluminum oxide.

Inventive Example 2

The following materials are admixed, in a kneader operated at 150° C., with 100 parts of a diorganopolysiloxane end-capped by trimethylsiloxy groups and composed of 99.93 mol % of dimethylsiloxane units and of 0.07 mol % of vinylmethylsiloxane units, with viscosity 8·10$^6$ mPa·s: firstly 50 parts of fumed silicon dioxide which is generated pyrogenically in the gas phase and whose specific surface area is 200 m$^2$/g, and then 1 part of dimethylpolysiloxane whose viscosity is 96 mPa·s end-capped by trimethylsiloxy groups, and then 7 parts of a dimethylpolysiloxane whose viscosity is 40 mPa·s having an Si-bonded hydroxy group in each of the terminal units, and then again 1 part of dimethylpolysiloxane whose viscosity is 96 mPa·s end-capped by trimethylsiloxy groups, and 1% by weight of an aluminum oxide powder whose specific surface area is at least about 100 m²/g and whose average primary particle size is 13 nm (commercially available as AEROXIDE® Alu C from Degussa AG, Germany).

This mixture is now mixed on a roll mill with 1.5% of 2,4-dichlorodibenzoyl peroxide (50% strength paste in silicone oil). The mixture has high sheet integrity. This is characterized in that two strips of thickness 1 cm and width 5 cm can be left in contact with one another for a number of days (=sheet integrity system) without blocking. If the aluminum oxide is omitted, blocking occurs. When the strips are subjected to tension, substantially higher ultimate tensile strength is found in the mixture comprising aluminum oxide.

Inventive Example 3

The following materials are admixed, in a kneader operated at 150° C., with 100 parts of a diorganopolysiloxane end-capped by trimethylsiloxy groups and composed of 99.93 mol % of dimethylsiloxane units and of 0.07 mol % of vinylmethylsiloxane units, with viscosity 8·10⁶ mPa·s: firstly 50 parts of fumed silicon dioxide which is generated pyrogenically in the gas phase and whose specific surface area is 200 m²/g, and then 1 part of dimethylpolysiloxane whose viscosity is 96 mPa·s end-capped by trimethylsiloxy groups, and then 7 parts of a dimethylpolysiloxane whose viscosity is 40 mPa·s having an Si-bonded hydroxy group in each of the terminal units, and then again 1 part of dimethylpolysiloxane whose viscosity is 96 mPa·s end-capped by trimethylsiloxy groups, and 1% by weight of an aluminum oxide powder whose specific surface area is at least about 100 m²/g and whose average primary particle size is 13 nm (commercially available as AEROXIDE® Alu C from Degussa AG, Germany).

This mixture is now mixed on a roll mill with 0.7% of dicumyl peroxide (98%). The roll mill is heated to 40° C. for the homogenization process.

After cooling, the mixture has high sheet integrity. This is characterized in that two strips of thickness 1 cm and width 5 cm can be left in contact with one another for a number of days (=sheet integrity system) without blocking. If the aluminum oxide is omitted, blocking occurs. When the strips are subjected to tension, substantially higher ultimate tensile strength is found in the mixture comprising aluminum oxide.

Inventive Example 4

The following materials are admixed, in a kneader operated at 150° C., with 100 parts of a diorganopolysiloxane end-capped by trimethylsiloxy groups and composed of 99.93 mol % of dimethylsiloxane units and of 0.07 mol % of vinylmethylsiloxane units, with viscosity 8·10⁶ mPa·s: firstly 50 parts of fumed silicon dioxide which is generated pyrogenically in the gas phase and whose specific surface area is 200 m²/g, and then 1 part of dimethylpolysiloxane whose viscosity is 96 mPa·s end-capped by trimethylsiloxy groups, and then 7 parts of a dimethylpolysiloxane whose viscosity is 40 mPa·s having an Si-bonded hydroxy group in each of the terminal units, and then again 1 part of dimethylpolysiloxane whose viscosity is 96 mPa·s end-capped by trimethylsiloxy groups, and 1% by weight of an aluminum oxide powder whose specific surface area is at least about 100 m²/g and whose average primary particle size is 13 nm (commercially available as AEROXIDE® Alu C from Degussa AG, Germany).

This mixture is then mixed on a roll mill with 1.2% of 2,5-bis(tert-butylperoxy)-2,5-dimethylhexane in the form of 50% strength paste in silicone rubber (obtainable commercially as "Varox").

The mixture has high sheet integrity. This is characterized in that two strips of thickness 1 cm and width 5 cm can be left in contact with one another for a number of days (=sheet integrity system) without blocking. If the aluminum oxide is omitted, blocking occurs. When the strips are subjected to tension, substantially higher ultimate tensile strength is found in the mixture comprising aluminum oxide.

Inventive Example 5

The following materials are admixed, in a kneader operated at 150° C., with 100 parts of a diorganopolysiloxane end-capped by trimethylsiloxy groups and composed of 99.93 mol % of dimethylsiloxane units and of 0.07 mol % of vinylmethylsiloxane units, with viscosity 8·10⁶ mPa·s: firstly 50 parts of fumed silicon dioxide which is generated pyrogenically in the gas phase and whose specific surface area is 200 m²/g, and then 1 part of dimethylpolysiloxane whose viscosity is 96 mPa·s end-capped by trimethylsiloxy groups, and then 7 parts of a dimethylpolysiloxane whose viscosity is 40 mPa·s having an Si-bonded hydroxy group in each of the terminal units, and then again 1 part of dimethylpolysiloxane whose viscosity is 96 mPa·s end-capped by trimethylsiloxy groups, and 1% by weight of an aluminum oxide powder whose specific surface area is at least about 100 m²/g and whose average primary particle size is 13 nm (commercially available as AEROXIDE® Alu C from Degussa AG, Germany).

This mixture is then mixed in an internal mixer with 0.7% of dicumyl peroxide (98%). The roll mill is heated to 40° C. for the homogenization process.

The mixture has high sheet integrity. This is characterized in that two strips of thickness 1 cm and width 5 cm can be left in contact with one another for a number of days (=sheet integrity system) without blocking. If the aluminum oxide is omitted, blocking occurs. When the strips are subjected to tension, substantially higher ultimate tensile strength is found in the mixture comprising aluminum oxide.

Inventive Example 6

The following materials are admixed, in a kneader operated at 150° C., with 100 parts of a diorganopolysiloxane end-capped by trimethylsiloxy groups and composed of 99.93 mol % of dimethylsiloxane units and of 0.07 mol % of vinylmethylsiloxane units, with viscosity 8·10⁶ mPa·s: firstly 50 parts of fumed silicon dioxide which is generated pyrogenically in the gas phase and whose specific surface area is 200 m²/g, and then 1 part of dimethylpolysiloxane whose viscosity is 96 mPa·s end-capped by trimethylsiloxy groups, and then 7 parts of a dimethylpolysiloxane whose viscosity is 40 mPa·s having an Si-bonded hydroxy group in each of the terminal units, and then again 1 part of dimethylpolysiloxane whose viscosity is 96 mPa·s end-capped by trimethylsiloxy groups, and 1% by weight of an aluminum oxide powder whose specific surface area is at least about 100 m²/g and whose average primary particle size is 13 nm (commercially available as AEROXIDE® Alu C from Degussa AG, Germany).

This mixture is then mixed in an internal mixer with 1.2% of 2,5-bis(tert-butylperoxy)-2,5-dimethylhexane in the form of 50% strength paste in silicone rubber (obtainable commercially as "Varox").

The mixture has high sheet integrity. This is characterized in that two strips of thickness 1 cm and width 5 cm can be left in contact with one another for a number of days (=sheet integrity system) without blocking. If the aluminum oxide is omitted, blocking occurs. When the strips are subjected to tension, substantially higher ultimate tensile strength is found in the mixture comprising aluminum oxide.

Inventive Example 7

The following materials are admixed, in a kneader operated at 150° C., with 100 parts of a diorganopolysiloxane end-capped by trimethylsiloxy groups and composed of 99.93 mol % of dimethylsiloxane units and of 0.07 mol % of vinylmethylsiloxane units, with viscosity 8·10⁶ mPa·s: firstly 50 parts of fumed silicon dioxide which is generated pyrogenically in the gas phase and whose specific surface area is 200 m²/g, and then 1 part of dimethylpolysiloxane whose viscosity is 96 mPa·s end-capped by trimethylsiloxy groups, and then 7 parts of a dimethylpolysiloxane whose viscosity is 40 mPa·s having an Si-bonded hydroxy group in each of the terminal units, and then again 1 part of dimethylpolysiloxane whose viscosity is 96 mPa·s end-capped by trimethylsiloxy groups, and 1% by weight of an aluminum oxide powder whose specific surface area is at least about 100 m²/g and whose average primary particle size is 13 nm (commercially available as AEROXIDE® Alu C from Degussa AG, Germany).

One half of the mixture is then mixed on a roll mill with 0.9% of 1,3-divinyl-1,1,3,3-tetramethyldisiloxaneplatinum complex (1% strength in silicone polymer) (component A).

The other half of the mixture is then mixed on a roll mill with 2% of Si—H crosslinking agent (preparation and 1% of inhibitor (ethynylcyclohexanol preparation in silicone rubber)) (component B).

The mixture has high sheet integrity. This is characterized in that two strips of thickness 1 cm and width 5 cm can be left in contact with one another for a number of days (=sheet integrity system) without blocking. If the aluminum oxide is omitted, blocking occurs. When the strips are subjected to tension, substantially higher ultimate tensile strength is found in the mixture comprising aluminum oxide.

These mixtures from Inventive examples 1-6 can be mixed individually or together.

In all cases, pellets can be produced by extrusion through a pelletizing die using a rotating knife.

Pellets composed of component A and component B of the last example can be premixed in a mixing drum and then processed as for a single-component system.

As an alternative, they can be introduced separately into a processing machine, which brings about the mixing.

The peroxidically crosslinked pellets can have been colored in advance, or can, shortly prior to processing, be processed using a pigment master batch produced as in Inventive example 1.

Ready-to-process mixtures using a peroxidic or addition crosslinking system can be pelletized without difficulty in the form of single- or multicomponent systems.

Comparative Examples 1-7

The procedure described in Inventive examples 1-7 is repeated with the modification that no aluminum oxide powder is added. The crosslinkable compositions obtained cannot be pelletized, but merely adhere to the pelletizing die and knife. The mixtures are tacky and have no sheet integrity.

What is claimed is:

1. A pelletizable composition comprising organosilicon compounds, and aluminum oxide powder with a specific surface area of at least 50 m²/g and with an average primary particle size of from 1 to 50 nm, and at least one filler other than aluminum oxide, wherein the organosilicon compounds comprise at least one organosilicon compound containing units of the formula $$R_a R^1_b Y_c SiO_{(4-a-b-c)/2} \quad (I),$$

where

R each is identical or different, and is a hydrogen atom or an optionally substituted, SiC-bonded, aliphatically saturated hydrocarbon moiety, $R^1$ each is identical or different, and is an SiC-bonded, aliphatically unsaturated hydrocarbon moiety, Y each is identical or different, and is a hydroxy moiety or hydrolyzable moiety, a is 0, 1, 2, or 3, b is 0, 1, 2, or 3, and c is 0, 1, 2, or 3, with the proviso that the sum a+b+c is ≦3 and wherein the viscosity of the organosilicon compounds is in the range of $10^6$ mPas to $10^9$ mPas at 25° C., wherein the aluminum oxide powder is present in an amount of from 0.1 to 20 parts by weight based on 100 parts of the composition, and wherein the composition is pelletizable in the absence of boric acid.

2. The composition of claim 1, wherein the aluminum oxide powder comprises fumed aluminum oxide.

3. The composition of claim 1, further comprising from 30 to 200 parts by weight of fumed silica powder, based on 100 parts by weight of the composition, the fumed silica having a specific surface area of 50 m²/g to 400 m²/g.

4. The composition of claim 2, further comprising from 30 to 200 parts by weight of fumed silica powder, based on 100 parts by weight of the composition, the fumed silica having a specific surface area of 50 m²/g to 400 m²/g.

5. The composition of claim 1, wherein the amount of aluminum oxide powder is from about 0.2 to 14 parts by weight based on 100 parts by weight of the composition.

6. The composition of claim 1, wherein the amount of aluminum oxide powder is from about 0.3 to 3 parts by weight based on 100 parts by weight of the composition.

7. The composition of claim 1, wherein the amount of aluminum oxide powder is about 1 part by weight based on 100 parts by weight of the composition.

8. The composition of claim 1, wherein the composition is in the form of pellets.

9. The composition of claim 3, wherein the composition is in the form of pellets.

10. The composition of claim 1, which is in the form of a non-blocking sheet or non-blocking pellets.

11. The composition of claim 1, wherein the composition is storable if water is excluded but which on ingress of water at room temperature crosslinks via condensation to provide an elastomer.

12. The composition of claim 1, wherein the composition is crosslinkable via an addition reaction of Si-bonded hydrogen onto an aliphatic carbon-carbon multiple bond.

13. The composition of claim 1, wherein the composition can be crosslinked peroxidically.

14. The composition of claim 1, wherein the composition can be crosslinked via radiation.

15. The composition of claim 1, wherein the at least one filler other than aluminum oxide comprises silica.

16. The composition of claim 15, wherein the silica comprises fumed silica.

* * * * *